(12) United States Patent
Min et al.

(10) Patent No.: US 10,549,604 B2
(45) Date of Patent: Feb. 4, 2020

(54) INDEPENDENTLY-CONTROLLED PTC HEATER AND DEVICE

(71) Applicants: JAHWA electronics Co., Ltd., Chungcheongbuk-do (KR); Hanon system Co., Ltd., Daejeon (KR)

(72) Inventors: Do Sik Min, Chungcheongbuk-do (KR); Jong Up Kim, Chungcheongbuk-do (KR); Sang Ho Oh, Daejeon (KR); Chae Geun Lim, Daejeon (KR); Joong Heum Jung, Daejeon (KR)

(73) Assignees: JAHWA ELECTRONICS CO., LTD., Chungcheonbuk-Do (KR); HANON SYSTEMS, Daejeon (KR)

( * ) Notice: Subject to any disclaimer, the term of this patent is extended or adjusted under 35 U.S.C. 154(b) by 0 days.

(21) Appl. No.: 15/511,522

(22) PCT Filed: Nov. 15, 2016

(86) PCT No.: PCT/KR2016/013116
§ 371 (c)(1),
(2) Date: Mar. 15, 2017

(87) PCT Pub. No.: WO2017/131327
PCT Pub. Date: Aug. 3, 2017

(65) Prior Publication Data
US 2019/0084374 A1    Mar. 21, 2019

(30) Foreign Application Priority Data

Jan. 28, 2016 (KR) .................. 10-2016-0010834

(51) Int. Cl.
*B60H 1/02* (2006.01)
*H05B 3/50* (2006.01)
(Continued)

(52) U.S. Cl.
CPC .............. *B60H 1/02* (2013.01); *F24H 3/047* (2013.01); *F24H 3/0435* (2013.01);
(Continued)

(58) Field of Classification Search
CPC ... H05B 3/03; H05B 3/06; H05B 3/10; H05B 3/12; H05B 3/26; H05B 3/20;
(Continued)

(56) References Cited

U.S. PATENT DOCUMENTS 5,192,853 A * 3/1993 Yeh .................. H05B 3/06
219/505
6,180,930 B1   1/2001 Wu
(Continued)

FOREIGN PATENT DOCUMENTS

JP   2004-338699 A   12/2004
JP   2005-276835 A   10/2005
(Continued)

OTHER PUBLICATIONS

Office action dated Jul. 2, 2019 from Japan Intellectual Property Office in a counterpart Japanese Patent Application No. 2018-538605 (all the cited references are listed in this IDS.).

*Primary Examiner* — Dana Ross
*Assistant Examiner* — Ayub A Maye
(74) *Attorney, Agent, or Firm* — The PL Law Group, PLLC (57) ABSTRACT

An independently-controlled PTC (Positive Temperature Coefficient) heater includes a PTC unit including first and second PTC elements for generating heat by an applied power, a guide frame having an opening to which the first and second PTC elements are mounted, first and second electrode plates configured to respectively make surface contact with one surfaces of the first and second PTC elements which are exposed through the opening, a common (Continued)

electrode plate configured to make surface contact with the other surfaces of both the first and second PTC elements which is exposed through the opening, and an insulation member configured to insulate the first electrode plate, the second electrode plate and the common electrode plate from an outside; and a heat diffusion fin provided at a side of the heating tube.

16 Claims, 6 Drawing Sheets

(51) Int. Cl.
| | |
|---|---|
| *F24H 3/04* | (2006.01) |
| *F24H 9/18* | (2006.01) |
| *H05B 1/02* | (2006.01) |
| *H05B 3/03* | (2006.01) |
| *H05B 3/06* | (2006.01) |
| *H05B 3/12* | (2006.01) |
| *H05B 3/26* | (2006.01) |
| *H05B 3/42* | (2006.01) |

(52) U.S. Cl.
CPC ......... *F24H 3/0447* (2013.01); *F24H 9/1872* (2013.01); *H05B 1/02* (2013.01); *H05B 3/03* (2013.01); *H05B 3/06* (2013.01); *H05B 3/12* (2013.01); *H05B 3/26* (2013.01); *H05B 3/42* (2013.01); *H05B 3/50* (2013.01); *H05B 2203/02* (2013.01); *H05B 2203/023* (2013.01)

(58) Field of Classification Search
CPC .... F24H 9/1872; F24H 9/1863; F24H 9/1854; B60H 1/00; B60H 1/02; B60H 1/22

USPC ................ 219/482, 459, 490, 200, 202, 540
See application file for complete search history.

(56) References Cited

U.S. PATENT DOCUMENTS

| | | | | |
|---|---|---|---|---|
| 7,064,301 | B2* | 6/2006 | Han ...................... | F24H 3/0405 |
| | | | | 219/202 |
| 7,098,426 | B2 | 8/2006 | Bohlender et al. | |
| 7,378,614 | B2* | 5/2008 | Lee ....................... | F24H 3/0405 |
| | | | | 219/202 |
| 7,627,234 | B2* | 12/2009 | Pierron ................ | B60H 1/2225 |
| | | | | 219/202 |
| 7,971,799 | B2* | 7/2011 | Colette ................ | B60H 1/2225 |
| | | | | 165/41 |
| 9,827,828 | B2* | 11/2017 | Hetzler ................ | B60H 1/2225 |
| 9,855,823 | B2* | 1/2018 | Johnston ............. | B60H 1/2225 |
| 10,363,797 | B2* | 7/2019 | Ritzhaupt ............ | F24H 3/0429 |
| 2002/0011484 | A1* | 1/2002 | Beetz .................. | B60H 1/2218 |
| | | | | 219/530 |

FOREIGN PATENT DOCUMENTS

| | | |
|---|---|---|
| JP | 2013-193513 A | 9/2013 |
| KR | 10-0575940 B1 | 5/2006 |
| KR | 10-2010-0064596 A | 6/2010 |
| KR | 10-2012-0041322 A | 5/2012 |
| KR | 10-2014-0096486 A | 8/2014 |
| KR | 10-2015-0078826 A | 7/2015 |
| WO | WO 2015/163526 A1 | 10/2015 |

* cited by examiner

INDEPENDENTLY-CONTROLLED PTC HEATER AND DEVICE

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2016/013116, filed Nov. 15, 2016, which claims priority to the benefit of Korean Patent Application No. 10-2016-0010834 filed in the Korean Intellectual Property Office on Jan. 28, 2016, the entire contents of which are incorporated herein by reference.

TECHNICAL FIELD

The present disclosure relates to a PTC heater and a device using the same, and more particularly, to a heater capable of independently controlling PTC elements included in a PTC heater for each sector and a heater device including the same.

BACKGROUND ART

A PTC element or a PTC thermistor, which is also called a positive temperature coefficient thermistor, exhibits a behavior characteristic in which at a specific temperature, its temperature rise due to phase transition to abruptly increase electric resistance.

Since electric resistance of the PTC element abruptly increases as described above, the PTC element is utilized as a switch for turning on/off power supply. Also, since the PTC element may reach a high temperature within a relatively short time and maintain the high temperature consistently, the PTC element is utilized as a heating body in a vehicle heater, a drier, a warmer, a medical instrument, a warmth mat, a heater or the like.

A PTC heater using the PTC element may include a heat diffusion fin which is generally attached to the PTC element to enhance heat diffusion efficiency of the PTC element. Also, if a power is applied to generate heat from the PTC element, the PTC heater allows air to pass through the PTC element and/or the heat diffusion fin and flow toward a target.

Commonly, a heater provided at a vehicle uses an engine room as a heat source. Here, a PTC heater may be applied as a pre-heater for preliminarily giving a heat beforehand before the temperature of the engine room rises to a suitable level.

Meanwhile, the interest on an electric vehicle has recently increased due to energy efficiency, environment-friendly issues or the like, and the electric vehicle does not have an engine room and thus a heater such as the PTC heater operated by an electric power source is mounted thereto.

Since an electric vehicle uses charged electric energy as a driving energy, electronic components having lower power consumption are generally loaded to the electric vehicle in order to ensure suitable mileage.

However, an existing PTC heater is generally developed as a universal heater, which is not optimized for vehicle environments such as vibrations caused by driving a vehicle, exposure to the outer environments, prevention of flooding or the like, and an optimal structure for energy efficiency is not applied to the existing PTC heater.

In particular, for the electric vehicle, the energy efficiency is a most important issue. However, an existing PTC heater is just configured to generate heat with a power applied thereto without classifying and individually controlling heating areas (for example, a driver seat and a passenger seat), but the existing PTC heater is just capable of generating heat with respect to a single target, which may waste energy unnecessarily.

Korean Unexamined Patent Publication No. 2012-0041322 and Korean Unexamined Patent Publication No. 2015-0078826 disclose a PTC heater mounted to a vehicle, but these documents just disclose a physical structure, arrangement or the like for enhancing thermal efficiency. Even though they have some disclosure in relation to temperature control for a driver seat and a passenger seat, this temperature control is performed using a PWM control signal, and thus there is a limit in perfectly classifying seating sectors and independently controlling the heating sectors within a limited space of a vehicle just through simple structure improvement.

SUMMARY

The present disclosure is designed to solve the problems of the related art, and therefore the present disclosure is directed to providing an independently-controlled PTC heater and a device using the same, which may maximize energy efficiency by classifying an area, heated by a single heating device, exactly into two or more sectors through a simple structural improvement without demanding an additional space so that a heating area in a vehicle may be selected as desired and a heating sector may be selectively heated according to the selection.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

In one aspect of the present disclosure, there is provided an independently-controlled PTC (Positive Temperature Coefficient) heater, comprising: a PTC unit including first and second PTC elements for generating heat by an applied power, a guide frame having an opening to which the first and second PTC elements are mounted, first and second electrode plates configured to respectively make surface contact with one surfaces of the first and second PTC elements which is exposed through the opening, a common electrode plate configured to make surface contact with the other surfaces of both the first and second PTC elements which is exposed through the opening, and an insulation member configured to insulate the first electrode plate, the second electrode plate and the common electrode plate from an outside; and a heat diffusion fin configured to emit heat generated at the PTC unit.

Here, the second PTC element of the present disclosure may be disposed to make a vertical arrangement together with the first PTC element based on a longitudinal direction of the first PTC element.

In addition, the first electrode plate of the present disclosure may include a first body configured to make surface contact with one surface of the first PTC element; and a first connector connected to an external power source and extending from the first body to be exposed out, the second electrode plate of the present disclosure may be located on the same plane as the first electrode plate, and the second electrode plate of the present disclosure may include: a second body configured to make surface contact with one surface of the second PTC element; and a second connector extending from the second body to be exposed out, the second connector extending in the same direction as the first connector to be connected to an external power source.

Further, the first connector of the present disclosure may be formed with a smaller width than the first body and extend to be biased in any one of right and left directions based on an upper center of the first body, and the second connector may be formed with a smaller width than the second body and extend to be biased in any one of right and left directions based on an upper center of the second body, which is opposite to the biasing direction of the first connector.

In order to implement a more desirable embodiment, the second connector of the present disclosure may be spaced apart from a side of the first body and extends from the second body over a longitudinal length of the first electrode plate.

In addition, the common electrode plate the present disclosure may include a third body configured to make contact with the other surface of both the first and second PTC elements; and a third connector connected to an external power source and extending on the third body in the same direction as the first and second connectors to be exposed out.

The opening of the present disclosure may include a first opening to which the first PTC element is mounted; and a second opening to which the second PTC element is mounted, and the first and second openings may be located to be biased at the guide frame.

The independently-controlled PTC heater of the present disclosure may further comprise a heating tube in which the PTC unit is mounted, the heating tube being made of a metal material, and the heat diffusion fin may be provided at a side of the heating tube.

In addition, the heat diffusion fin of the present disclosure may be dualized to correspond to locations of the first and second PTC elements and provided at a side of the heating tube, and further, the independently-controlled PTC heater of the present disclosure may further comprises a heat shielding member provided between the dualized heat diffusion fins, and a sealing member coupled to a lower portion of the heating tube.

Further, the first, second or third connector of the present disclosure may include a bent end to give an elastic force when being connected to an electric terminal.

In another aspect of the present disclosure, there is also provided an independently-controlled heater device, comprising: a plurality of independently-controlled PTC heaters; a housing in which the plurality of independently-controlled PTC heaters are provided in a vertical direction; a first power source electrically connected to all of the plurality of first electrode plates; a second power source electrically connected to all of the plurality of second electrode plates; a common power source electrically connected to all of the plurality of common electrode plates; and a control unit configured to control power applied to the first and second power sources by means of an external control signal.

An independently-controlled PTC heater according to an embodiment of the present disclosure may independently heat two or more heating sectors, which are classified just through a simple structural improvement, by using a single PTC heater, without providing a plurality of PTC heaters to the heating sectors individually.

The independently-controlled PTC heater and the heater device according to the present disclosure may allow independent control of each heating sector in a single PTC heater or device, and thus, when being applied to an electric vehicle, the PTC heater of the present disclosure may maximize energy efficiency by consuming minimal electric energy.

In addition, in an embodiment of the present disclosure, the independently-controlled PTC heater may cope with external environments such as vibration, impact, flooding or the like more robustly, and thus it is possible to implement a heater or a heater device more optimized for an electric vehicle environment.

BRIEF DESCRIPTION OF THE DRAWINGS

The accompanying drawings illustrate a preferred embodiment of the present disclosure and together with the foregoing disclosure, serve to provide further understanding of the technical spirit of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

An independently-controlled PTC (Positive Temperature Coefficient) heater (hereinafter, referred to as a 'PTC heater') 1000 according to the present disclosure is a heater capable of individually and independently heating two or more sectors in a single module or unit by means of a PTC element and a structural improvement of a power applying configuration for the PTC element.

Figure 1:
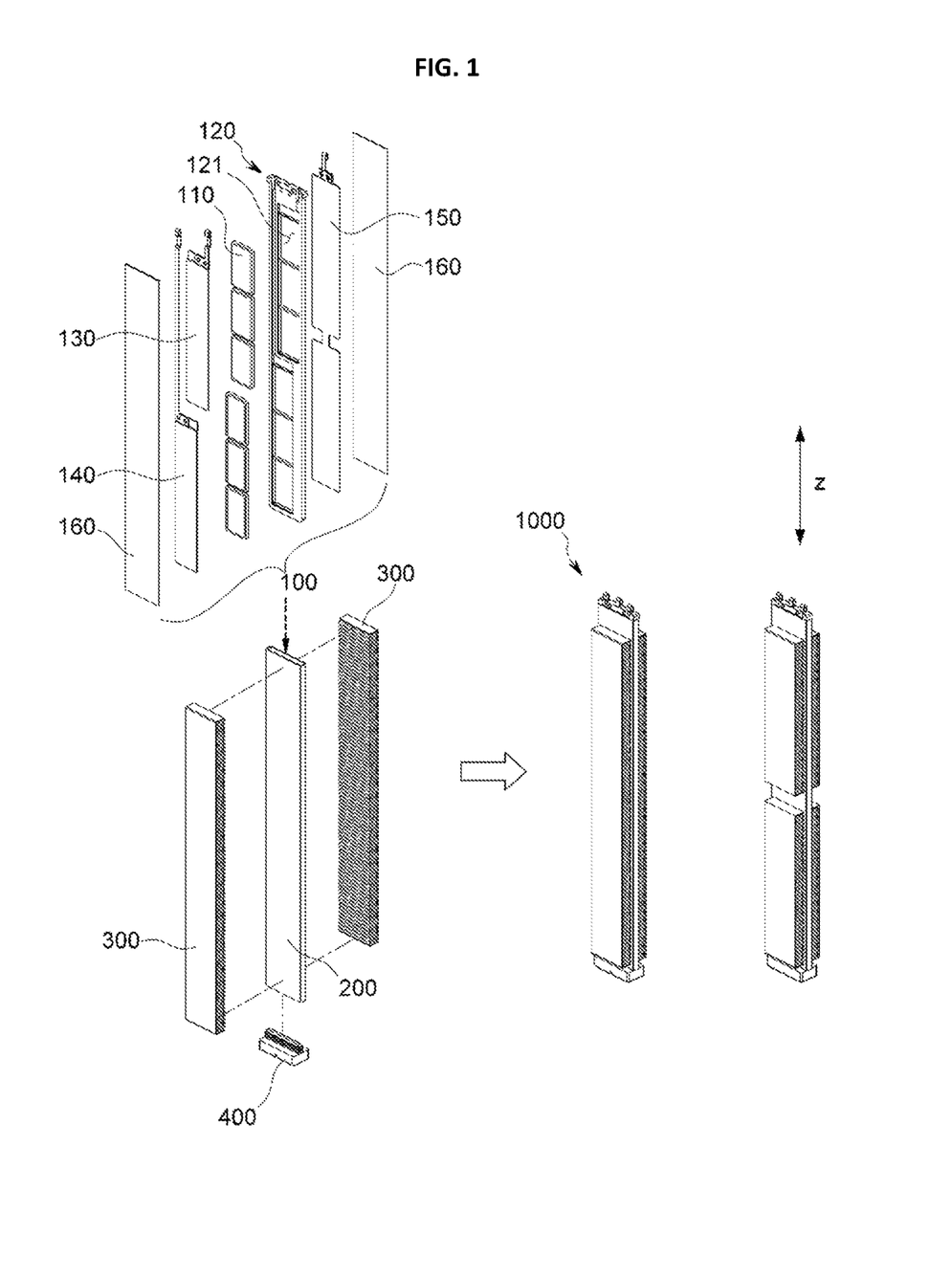
FIG. 1 is an exploded view showing an independently-controlled PTC heater according to an embodiment of the present disclosure.

A directional axis Z depicted in FIG. 1 or the like is a directional axis for setting a criterion for direction in the present disclosure, and the Z axis represents a vertical longitudinal direction of the PTC heater 1000 according to the present disclosure.

FIG. 1 is an exploded view showing a PTC heater 1000 according to an embodiment of the present disclosure. The PTC heater 1000 of the present disclosure may include a PTC unit 100, a heating tube 200 and a heat diffusion fin 300, as shown in FIG. 1.

As shown in FIG. 1, the PTC unit 100 may include a PTC element 110, a guide frame 120, electrode plates 130, 140, 150 and an insulation member 160.

Figure 2:
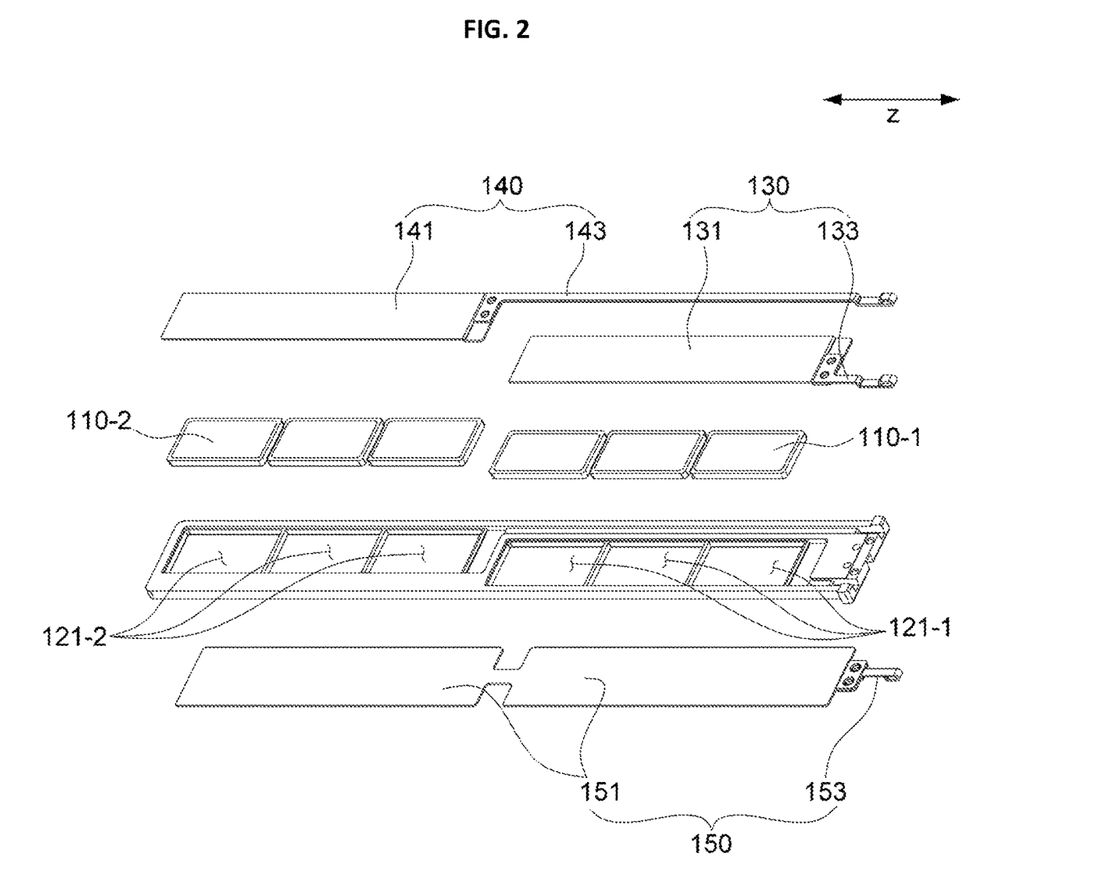
FIG. 2 is a diagram showing a guide frame, a PTC element and an electrode plate according to the present disclosure, employed in the independently-controlled PTC heater of FIG. 1.

The PTC element 110 means an object which generates Joule heat by a power applied thereto and may have an approximately rectangular plate shape as shown in the figure. Also, the PTC element 110 may be classified into two sectors, namely a first PTC element 110-1 and a second PTC element 110-2 which are distinguishably operated, as shown in FIG. 2.

In the present disclosure, a plurality of sectors are classified and heated independently as described above. In the following description, a heating area is classified into two sectors as an example, but the heating area may also be classified into three or more sectors and individually heated, which also falls within the scope of the present disclosure.

The second PTC element 110-2 is disposed above or below the first PTC element 110-1 based on a longitudinal direction of the first PTC element 110-1 as shown in the figures to make a vertical arrangement together with the first PTC element 110-1, so that the first PTC element 110-1 and the second PTC element 110-2 are dualized in a vertical direction (based on the Z axis).

As shown in FIG. 1 or the like, the first PTC element 110-1 and the second PTC element 110-2 may be respectively composed of at least one PTC element. Also, though the first PTC element 110-1 and the second PTC element 110-2 are depicted as being composed of the same number of PTC elements, the numbers of PTC elements of the first PTC element 110-1 and the second PTC element 110-2 may also be different.

For example, when the PTC heater 1000 or the PTC heater device 2000, explained later, according to the present disclosure are applied to a vehicle, a sector corresponding to a driver seat may be more frequently heated in comparison to a sector corresponding to a passenger seat. In this case, the first PTC element 110-1 (a sector corresponding to a driver seat) may be composed of five PTC elements, and the second PTC element 110-2 (a sector corresponding to a passenger seat) may be composed of three PTC elements.

As shown in FIG. 1 or the like, the PTC element 110 is coupled to be fit into the guide frame 120. In detail, as shown in FIG. 2, the first PTC element 110-1 and the second PTC element 110-2 are respectively fit into a first opening 121-1 and a second opening 121-2 formed in an open area of the guide frame 120.

The electrode plates 130, 140, 150 of the present disclosure may be made of a metal plate with a conductive material capable of applying a power to a PTC element. As shown in FIG. 1 or the like, a positive (plus) electrode plate is dualized into the first electrode plate 130 and the second electrode plate 140, and a common electrode, namely a ground or negative (minus) electrode plate is applied to the single common electrode plate 150.

This will be described in more detail. The first electrode plate 130 of the present disclosure make surface contact with one surface of the first PTC element 110-1 whose both surfaces are exposed through the first opening 121-1, and the second electrode plate 140 make surface contact with one surface of the second PTC element 110-2 whose both surfaces are exposed through the second opening 121-2.

Here, one surface of the first PTC element 110-1 and one surface of the second PTC element 110-2 are exposed in the same direction.

As shown in the figures, the surfaces of the first electrode plate 130 and the second electrode plate 140, which make surface contact with the first and second PTC elements 110-1, 110-2, are oriented in the same direction, and they respectively make surface contact with the PTC elements with the same planar shape at the same height.

In this regard, the common electrode plate 150 of the present disclosure is configured to make surface contact with both of the first PTC element 110-1 and the second PTC element 110-2 at the other surface which is opposite to one surface where the first electrode plate 130 and the second electrode plate 140 respectively make surface contact with the PTC elements 110-1, 110-2.

Since the first electrode plate 130 and the common electrode plate 150, and also the second electrode plate 140 and the common electrode plate 150, form a closed circuit, if power is applied to the first electrode plate 130, the first PTC element 110-1 generates heat, and if power is applied to the second electrode plate 140, the second PTC element 110-2 generates heat.

Meanwhile, as shown in FIG. 1, an insulation member 160 is provided out of the first electrode plate 130, the second electrode plate 140 and the common electrode plate 150 for electric insulation. The insulation member 160 may have various shapes, and a film shape is desirable to minimize volume and weight.

The PTC unit 100 of the present disclosure includes the PTC element 110, the guide frame 120, the electrode plates 130, 140, 150 and the insulation member 160 as described above, and these components are assembled and then inserted into a heating tube 200 of the present disclosure, as shown in FIG. 1.

The heating tube 200 may be made of aluminum which has electric conductivity and ensure high thermal conduction and easy processing. If the PTC unit 100 is mounted in the heating tube 200, the heating tube 200 may be compressed thereto with a pressure applied from the outside in order to ensure reliable electric contacts among internal components.

The heat diffusion fin 300 of the present disclosure is attached to an outer circumference of the heating tube 200 in order to improve thermal conduction further. The heat diffusion fin 300 of the present disclosure may be provided at the heating tube 200 to be dualized to correspond to locations of the first PTC element 110-1 and the second PTC element 110-2 as shown in FIG. 1 to independently heat each sector more effectively.

In this case, in some embodiments, a heat shielding member 2400 (FIG. 5) may be further provided between each dualized heat diffusion fins 300 in order to minimize that the heat generated at the heating tube 200 is transferred to another heating tube.

In addition, as shown in FIG. 1, the PTC heater 1000 of the present disclosure may further include a sealing member 400 for sealing the opening at a lower portion of the heating tube 200. Since the sealing member 400 seals the heating tube 200, it is possible to cope with moisture penetration, flooding or the like more robustly. As shown in the figures, the sealing member 400 may be provided as a cap, which however may be modified into various shapes, materials, structures or the like.

Hereinafter, electrode arrangements, structure, location s of the PTC elements according to the present disclosure will be described with reference to the accompanying drawings.

FIG. 2 is a diagram showing the guide frame 120, the PTC element 110 and the electrode plates 130, 140, 150 according to the present disclosure, depicted in FIG. 1, in detail.

At the guide frame 120 of the present disclosure, the openings 121-1, 121-2 to which the PTC elements 110 are mounted and the areas to which the electrode plates 130, 140, 150 are mounted may be stepped as shown in FIG. 2 to ensure more reliable contacts between the PTC element 110 and the electrode plates 130, 140, 150 and reduce an overall volume.

As shown in FIG. 2, the first electrode plate 130 of the present disclosure includes a first body 131 and a first connector 133. Here, the first body 131 makes surface contact with one surface of the first PTC element 110-1, and the first connector 133 is connected to an external power source and extends from the first body 131 to be exposed or protruded out.

The second electrode plate 140 has a structure corresponding to the first electrode plate 130. In detail, the second electrode plate 140 includes a second body 141 making surface contact with one surface of the second PTC element 110-2 and a second connector 143 extending from the second body 141 to be exposed or protruded out and connected to an external power source.

As shown in the figures, the common electrode plate 150 includes a third body 151 and a third connector 153, and the third body 151 make surface contact with the other surface of both of the first PTC element 110-1 and the second PTC element 110-2.

In addition, the third connector 153 of the common electrode plate 150 is formed with a smaller width than the third body 151 and extends in the same direction as the first and second connectors 133, 143 at an upper center of the third body 151 to be exposed out and electrically connected to an external common power source.

As shown in the figures, the second electrode plate 140 of the present disclosure is located on the same plane as the first electrode plate 130. Since the first and second electrode plates 130, 140 are located on the same plane, it is possible to minimize size and volume of the PTC heater 1000, which enhances device expandability.

The second connector 143 provided at the second electrode plate 140 of the present disclosure extends from the second body 141 to be exposed out, and the second connector 143 may be configured to extend in the same direction as the first connector 133.

If the first and second connectors 133, 143 of the first and second electrode plates 130, 140 are protruded or exposed in the same direction as described above, they may be electrically connected to an external power source with a simple structure, and when being mounted to a vehicle, electrode connection portions may be entirely located in an upper direction identically, which may more effectively prevent a short circuit caused by flooding or introduction of alien substances such as dust.

The first body 131 and the first connector 133 of the first electrode plate 130 may be provided in an integrated form, or may also be prepared as separate parts and then coupled to each other as shown in the figures in consideration of efficiency in processing, shaping or the like.

As shown in FIG. 2, the common electrode plate 150 of the present disclosure may include a third body 151 making surface contact with both of the first PTC element 110-1 and the second PTC element 110-2 and a third connector 153 extending from the third body 151 to be exposed out and electrically connected to an external power source.

As shown in the figures, the common electrode plate 150 of the present disclosure may have a concave portion formed at a center portion in a length direction (in a Z-axial direction), and a groove may be formed at the guide frame 120 to correspond to the shape. Through such structural coupling, the common electrode plate 150 of the present disclosure may be configured not to be separated from the guide frame 120 and also ensure convenient assembling and mounting.

In addition, if the common electrode plate 150 has a dent portion at its center portion as shown in the figures, when only one of the first PTC element 110-1 and the second PTC element 110-2 is operated to generate heat, it is possible to minimize a heat transfer from an element operated to generate heat to an element not operated to generate heat, which may further ensure thermal safety and stability of the non-operated element and relevant components.

In order to further simplify the electrode structure and more effectively implement an electric connection structure to an external power source, the first connector 133 of the first electrode plate 130 may be formed to have a smaller width than the first body 131 and extend to be biased in any one of right and left directions based on a center of an upper portion (an upper portion based on the Z-axis direction) of the first body 131.

In this regard, the second connector 143 of the second electrode plate 140 may be formed with a smaller width than the second body 141 extend to be biased in any one of right and left directions based on an upper center of the second body 141, so that its biasing direction is opposite to the biasing direction of the first connector 133.

In this structure, the first connector 133 and the second connector 143 of the first electrode plate 130 are spaced apart from each other and exposed to each other within a physical limit of the PTC heater 1000 of the present disclosure, thereby preventing an electric short circuit and also ensure more accurate electric connection with the external power source.

More preferably, as shown in the figures, the second connector 143 of the present disclosure is spaced apart from a side of the first body 131 of the first electrode plate 130 and extends from the second body 141 over an entire length of the first electrode plate 130 (in the Z-axis direction), namely over a longitudinal length of the first electrode plate 130.

In this configuration, the first electrode plate 130 and the second electrode plate 140 are effectively spaced apart from each other, and the first connector 133 and the second connector 143 may extend in the same direction. Thus, the structure for applying power to the first electrode plate 130 and the second electrode plate 140 may be implemented more simply and accurately.

Since the common electrode plate 150 is present on a plane different from the first electrode plate 130 and the second electrode plate 140 as described above, the third connector 153 of the common electrode plate 150 are spaced apart from the first and second connectors 133, 143 of the first and second electrode plates 130, 140. Further, the third connector 153 may be three-dimensionally spaced apart from the first connector 133 and the second connector 143 which extend from the upper center of the common electrode plate 150 and are biased right and left, respectively.

Hereinafter, the guide frame 120 according to the present disclosure will be described with reference to FIG. 3.

Figure 3:
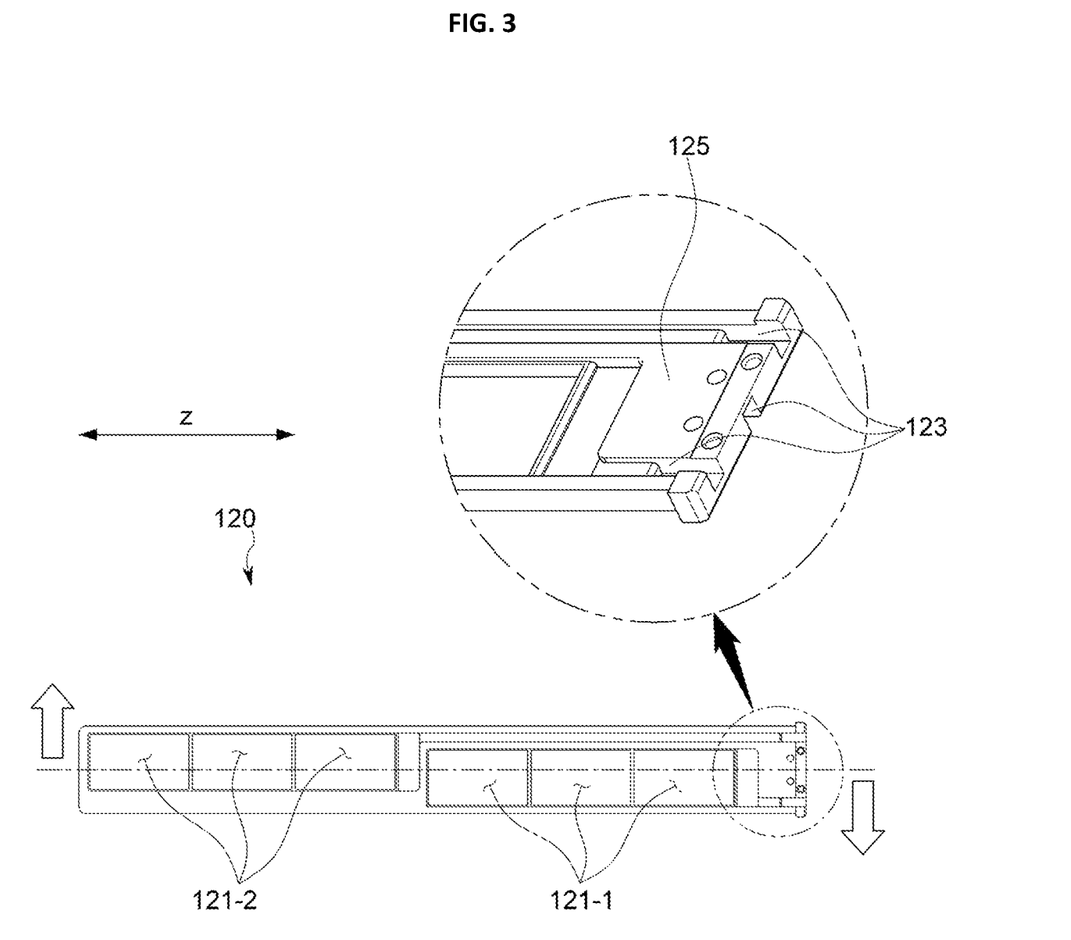
FIG. 3 is a diagram showing a guide frame according to an embodiment of the present disclosure in detail.

FIG. 3 is a diagram showing the guide frame 120 according to an embodiment of the present disclosure in detail.

As shown in FIG. 3, the guide frame 120 of the present disclosure has a first opening 121-1 and a second opening 121-2 which form opened areas. As described above, the first opening 121-1 corresponds to an area where the first PTC element 110-1 is mounted, and the second opening 121-2 corresponds to an area where the second PTC element 110-2 is mounted.

As shown in the figures, the first opening 121-1 and the second opening 121-2 are configured so that, if the first opening 121-1 is located to be biased in a right direction (a lower direction in FIG. 3) based on a vertical direction (Z axis), the second opening 121-2 is located to be biased in a left direction (an upper direction in FIG. 3). If the first opening 121-1 is biased in a direction opposite to the above, the second opening 121-2 is also biased in an opposite direction correspondingly.

If the openings 121-1, 121-2 to which the PTC elements 110 are respectively mounted are biased from each other in a vertical direction (in a Z-axial direction), their electric connection may be separated more clearly, and the areas where the first connector 133 and the second connector 143 are disposed may be ensured more effectively.

If the first opening 121-1 and the second opening 121-2 are biased based on a vertical direction, the first electrode plate 130 and the second electrode plate 140 may also be biased to correspond to the biasing directions of the first opening 121-1 and the second opening 121-2.

For example, based on FIG. 3, if the first opening 121-1 is biased in a lower direction (in a right direction based on the Z axis), the first electrode plate 130 is also biased in a lower direction, and the first connector 133 of the first electrode plate 130 also extends from the first body 131 to be biased in a lower direction (in a right direction based on the Z axis).

In this point of view, the second opening 121-2 is biased in an upper direction (in a left direction based on the Z axis), the second electrode plate 140 is also biased in an upper direction, and the second connector 143 also extends from the second body 141 to be biased in an upper direction (in a left direction based on the Z axis).

In addition, as shown in FIG. 3, a protrusion 125 having a step for preventing the first connector 133, the second connector 143 and the third connector 153 as well as the guide grooves 123 at which the connectors 133, 143, 153 are placed from deviating outwards is formed at an end of the guide frame 120 of the present disclosure, so that the first connector 133, the second connector 143 and the third connector 153 are not separated but fixed at their locations.

Hereinafter, an independently-controlled heater device 2000 according to the present disclosure including at least one PTC heater 1000 of the present disclosure will be described in detail with reference to FIGS. 4 and 5.

Figure 4:
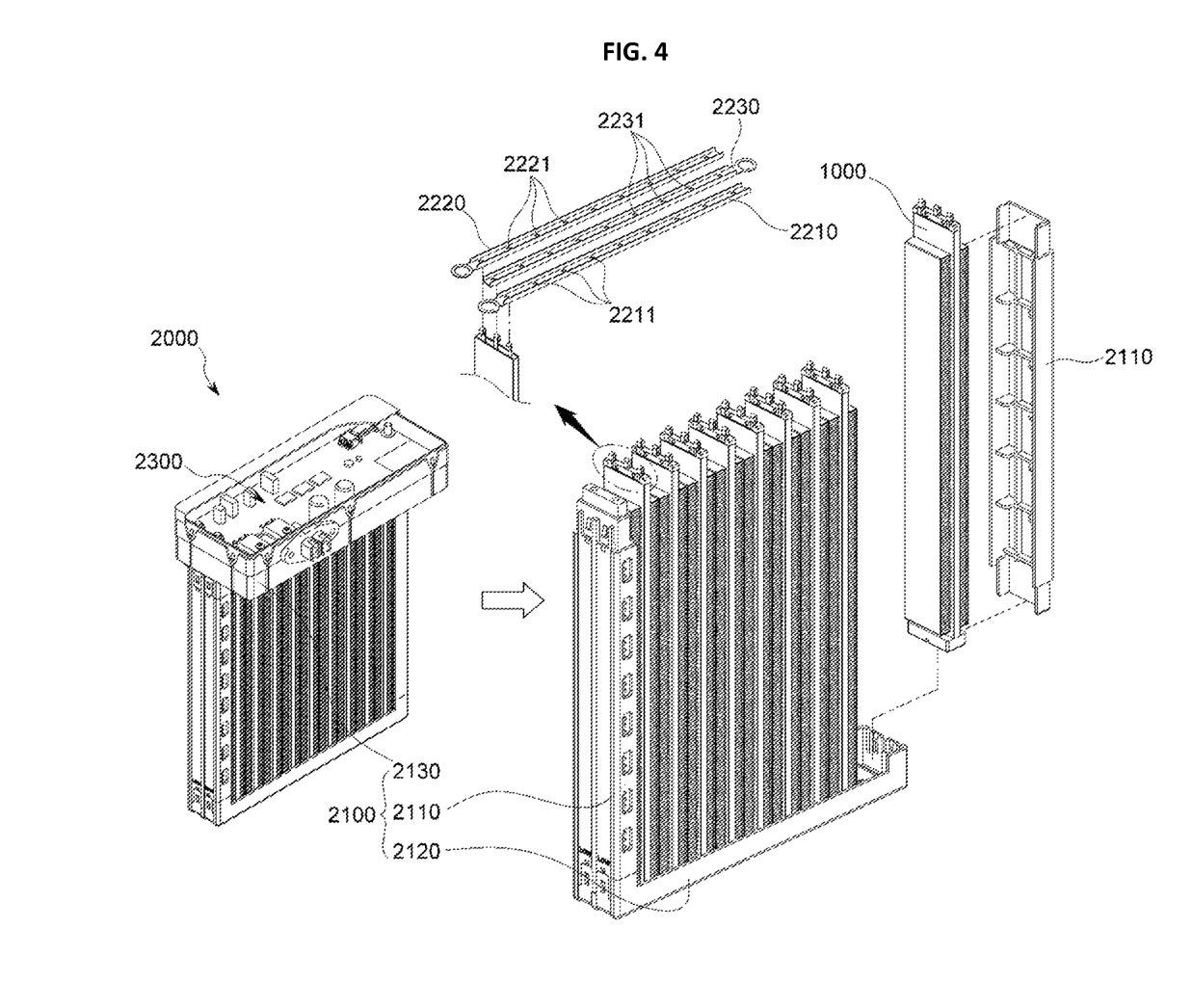
FIG. 4 is a diagram showing an independently-controlled heater device according to an embodiment of the present disclosure.
Figure 5:
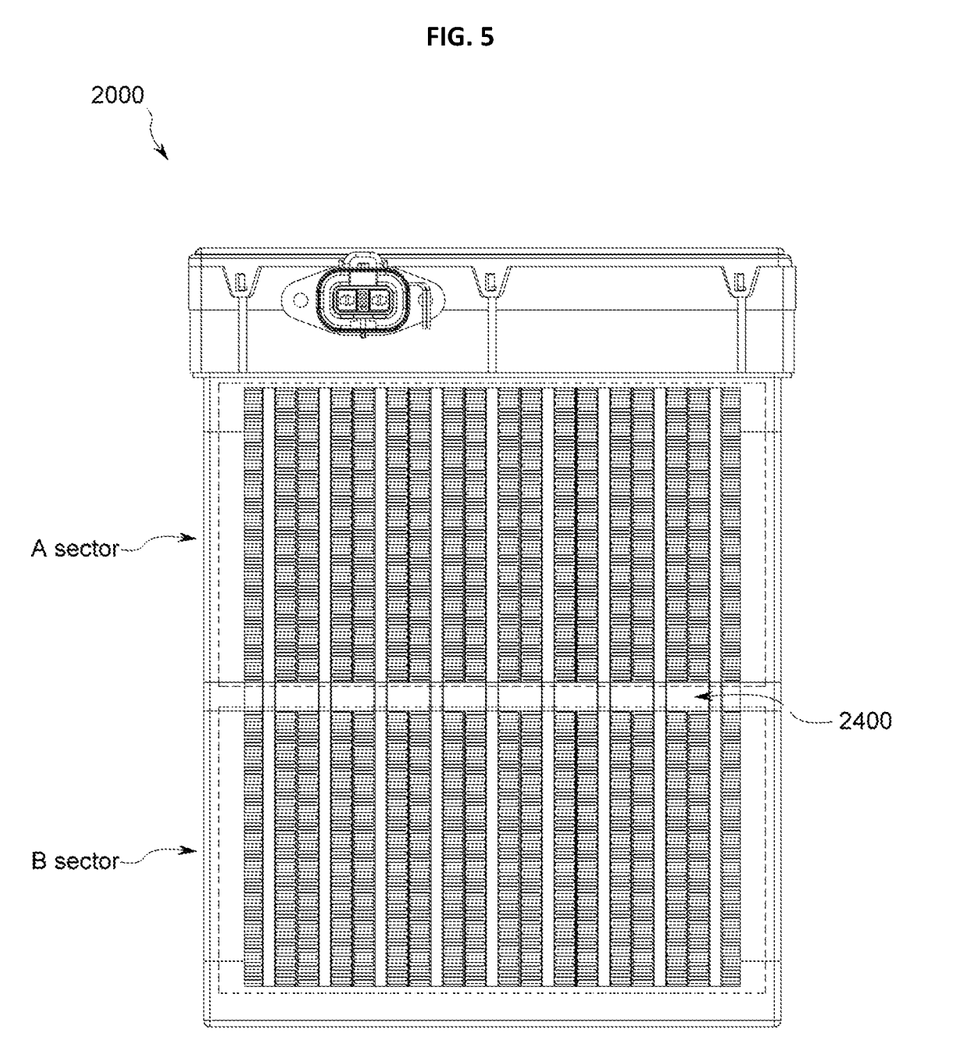
FIG. 5 is a diagram for illustrating a sector-based heating operation of the independently-controlled heater device of FIG. 4.

FIG. 4 is a diagram showing an independently-controlled heater device 2000 (hereinafter, referred to as a 'heater device') according to an embodiment of the present disclosure, and FIG. 5 is a diagram for illustrating an operation of the independently-controlled heater device of FIG. 4, which heat sectors independently.

As shown in FIG. 4, the heater device 2000 of the present disclosure may include a housing 2100, at least one PTC heater 1000 as described above, a first power source 2210, a second power source 2220, a common power source 2230 and a control unit 2300.

At least one PTC heater 1000 as described above is provided in a vertical direction at the housing 2100 of the heater device 2000 according to the present disclosure. As described above, the PTC heater 1000 is mounted to a lower holder 2120 of the housing 2100 so that the first connector 133, the second connector 143 and the third connector 153 are placed at an upper side based on a Z-axial direction (a vertical direction), and the sealing member 400 is placed at a bottom.

By using this configuration, a power applying or connecting structure may be provided at a location spaced apart from a bottom of a vehicle, which may prevent various safety problems.

The housing 2100 is a component corresponds to a case of the heater device 2000 of the present disclosure, and includes a lower holder 2120 located at a lower side and a side frame 2110 located at a lateral side. At an upper side, the housing 2100 includes an upper case 2130 having a control unit 2300 in charge of controlling power supplied to the PTC heater 1000, receiving a control signal by means of user interfacing or the like.

The side frame 2110 may further include a heat sink, and at least one opening/closing portion may be provided for forming an air channel and allow effective movement of a heated air.

The control unit 2300 may be configured as a combination of various electric and electronic elements and parts, as obvious in the art, and thus its detailed shape or structure is not described here.

Since the first to third connectors 133, 143, 153 provided at the PTC heater 1000 of the present disclosure are exposed in the same direction and spaced apart from each other as described above, the electric connection structure to an external power source may be simply implemented.

As shown in FIG. 4, the first power source 2210 has a plurality of fitting grooves 2211, and a plurality of first connectors 133 of a plurality of first electrode plates 130 are coupled to the first fitting grooves 2211 so that the first connectors 133 are entirely electrically connected to a single first power source 2210.

Similarly, a plurality of second connectors 143 of a plurality of second electrode plates 140 are entirely electrically connected to a single second power source 2220 through the second fitting grooves 2221 of the second power source 2220, and a plurality of third connectors 153 of a plurality of common electrode plates 150 are entirely electrically connected to a single common power source 2230 through the third fitting grooves 2231 of the common power source 2230.

The control unit 2300 of the present disclosure controls a power applied to the first power source 2210 and the second power source 2220 by means of an external control signal so that a plurality of PTC heaters 1000 provided at the heater device 2000 of the present disclosure heat individual sectors.

As shown in FIG. 5, in the present disclosure, sectors are classified in a single device, and the classified sectors (a sector A and a sector B) may be independently heated. Also, by coupling an air conditioning structure or a duct structure for forming a channel of a heated air to the sector A and the sector B, the heated air may flow out toward a space which needs to be heated.

Therefore, if the heater device 2000 according to the present disclosure is mounted to a vehicle or the like, space efficiency may be enhanced, and heating sectors may be individually and independently heated so that only a desired space may be selectively heated, thereby further improving electric energy efficiency and heating efficiency.

Figure 6:
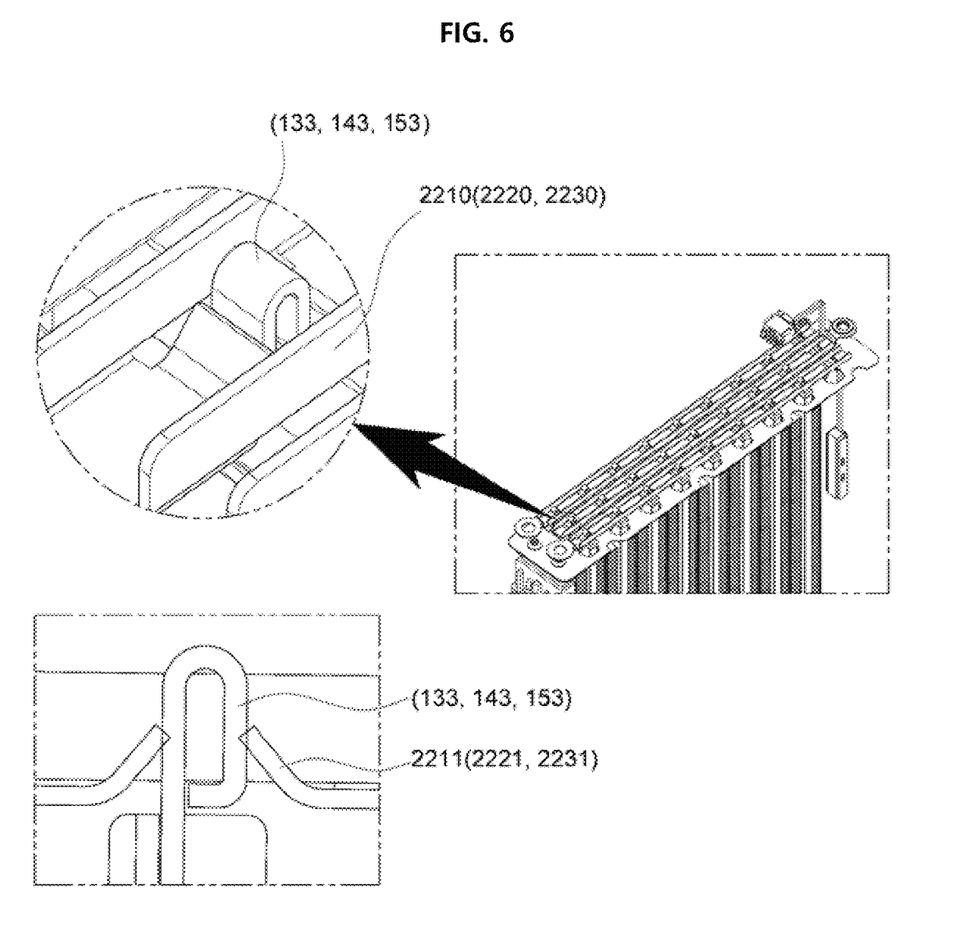
FIG. 6 is a diagram showing an end of a connector according to an embodiment of the present disclosure.

Meanwhile, FIG. 6 is a diagram showing ends of the connectors 133, 143, 153 according to an embodiment of the present disclosure. The first, second and third connectors 133, 143, 153 of the present disclosure may have a rolled end or a bent end as shown in FIG. 6.

In this case, if an end of a connector made of a metal material is connected to an electric terminal by means of fitting or the like, an elastic force may be provided between the connector and the electric terminal, which may enhance adhesion between the connector and the electric terminal and thus ensure more reliable electric connection.

The fitting groove 2211 of the first power source 2210, the fitting groove 2221 of the second power source 2220, and the fitting groove 2231 of the common power source 2230, which are electrically connected to the connectors 133, 143, 153 to ensure more reliable contact between them by means of an elastic force may be configured so that one side or both sides thereof are inclined.

In the present disclosure, the terms 'first', 'second' and 'third' are just used for relatively distinguishing components from each other and should not be interpreted as representing a specific order, priority or the like.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

The drawings accompanying herein for illustrating embodiments of the present disclosure may be somewhat exaggerated for emphasizing or highlighting some features of the present disclosure, but it should be understood that various modifications can be obviously made in consideration of the features depicted in the drawings by those having ordinary skill in the art.

What is claimed is:

1. An independently-controlled positive temperature coefficient (PTC) heater, comprising: a PTC unit comprising:
   a first PTC element; a second PTC element;
   a guide frame having a first opening to which the first PTC element is mounted and a second opening to which the second PTC element is mounted, the second opening being located to be biased from the first opening;
   a first electrode plate having a first body configured to make surface contact with the first PTC element and a first connector extending from the first body, the first connector being formed with a smaller width than the first body;
   a second electrode plate having a second body configured to make surface contact with the second PTC element and a second connector extending from the second body and extending besides the first body, the second connector being formed with a smaller width than the second body, wherein the second connector extends at different location from the first connector, wherein the first electrode date and the second electrode plate make surface contact with the first PTC element and the second PTC element at a first side of the guide frame; and
   a common electrode plate having a third body configured to make contact with the guide frame and to make contact with both the first and second PTC elements at a second side of the guide frame, wherein the second side is opposite of the first side and a third connector extending from the third body, the third connector being formed with a smaller width than the third body, wherein the third connector extends at different location from the first and second connectors and wherein the second and third connectors extend in the same direction as the first connector;
   and a heating tube in which the PTC unit is mounted.

2. The independently-controlled PTC heater according to claim 1, wherein the second connector is spaced apart from a side of the first body and extends from the second body longer than a length of the first electrode plate.

3. The independently-controlled PTC heater according to claim 1, further comprising:
   heat diffusion fins provided at a side of the heating tube, wherein the heat diffusion fins are dualized to correspond to locations of the first and second PTC elements.

4. The independently-controlled PTC heater according to claim 1, further comprising:
   a sealing member coupled to a lower portion of the heating tube.

5. The independently-controlled PTC heater according to claim 1, wherein the first or second connector includes a bent end to give an elastic force when being connected to an electric terminal.

6. An independently-controlled heater device, comprising:
   a plurality of the independently-controlled PTC heaters of claim 1;
   a housing in which the plurality of independently-controlled PTC heaters are provided in a vertical direction;
   a first power source electrically connected to all of the plurality of first electrode plates;
   a second power source electrically connected to all of the plurality of second electrode plates;
   a common power source electrically connected to all of the plurality of common electrode plates; and
   a control unit configured to control power applied to the first and second power sources by means of an external control signal.

7. The independently-controlled PTC heater according to claim 1, wherein the second connector extends from the second body at a location different from location where the first connector extend from the first body; and
   the third connector extends from the third body at a location different from locations where the first connector extends from the first body and the second connector extends from the second body.

8. The independently-controlled PTC heater according to claim 1, wherein the first connector, the second connector and the third connector are mounted on different positions of the guide frame.

9. The independently-controlled PTC heater according to claim 1, wherein the first connector, the second connector and the third connector are exposed outside at different positions of a same side of the independently-controlled PTC heater to be electrically connected to an external power source.

10. The independently-controlled PTC heater according to claim 1, wherein the independently-controlled PTC heater is mounted on a vehicle.

11. The independently-controlled PTC heater according to claim 3, further comprising:
    a heat shielding member provided between the dualized heat diffusion fins.

12. An independently-controlled heater device, comprising:
    a plurality of the independently-controlled PTC heaters of claim 2;
    a housing in which the plurality of independently-controlled PTC heaters are provided in a vertical direction;

a first power source electrically connected to all of the plurality of first electrode plates;

a second power source electrically connected to all of the plurality of second electrode plates;

a common power source electrically connected to all of the plurality of common electrode plates; and a control unit configured to control power applied to the first and second power sources by means of an external control signal.

13. An independently-controlled heater device, comprising:

a plurality of the independently-controlled PTC heaters of claim 3;

a housing in which the plurality of independently-controlled PTC heaters are provided in a vertical direction;

a first power source electrically connected to all of the plurality of first electrode plates;

a second power source electrically connected to all of the plurality of second electrode plates;

a common power source electrically connected to all of the plurality of common electrode plates; and a control unit configured to control power applied to the first and second power sources by means of an external control signal.

14. An independently-controlled heater device, comprising:

a plurality of the independently-controlled PTC heaters of claim 4;

a housing in which the plurality of independently-controlled PTC heaters are provided in a vertical direction;

a first power source electrically connected to all of the plurality of first electrode plates;

a second power source electrically connected to all of the plurality of second electrode plates;

a common power source electrically connected to all of the plurality of common electrode plates; and a control unit configured to control power applied to the first and second power sources by means of an external control signal.

15. An independently-controlled heater device, comprising:

a plurality of the independently-controlled PTC heaters of claim 5;

a housing in which the plurality of independently-controlled PTC heaters are provided in a vertical direction;

a first power source electrically connected to all of the plurality of first electrode plates;

a second power source electrically connected to all of the plurality of second electrode plates;

a common power source electrically connected to all of the plurality of common electrode plates; and a control unit configured to control power applied to the first and second power sources by means of an external control signal.

16. An independently-controlled heater device, comprising:

a plurality of the independently-controlled PTC heaters of claim 11;

a housing in which the plurality of independently-controlled PTC heaters are provided in a vertical direction;

a first power source electrically connected to all of the plurality of first electrode plates;

a second power source electrically connected to all of the plurality of second electrode plates;

a common power source electrically connected to all of the plurality of common electrode plates; and a control unit configured to control power applied to the first and second power sources by means of an external control signal.

* * * * *